United States Patent
Li et al.

(10) Patent No.: US 9,507,514 B2
(45) Date of Patent: Nov. 29, 2016

(54) ELECTRONIC DEVICES AND RELATED INPUT DEVICES FOR HANDWRITTEN DATA AND METHODS FOR DATA TRANSMISSION FOR PERFORMING DATA SHARING AMONG DEDICATED DEVICES USING HANDWRITTEN DATA

(71) Applicant: HTC Corporation, Taoyuan, Taoyuan County (TW)

(72) Inventors: Chun-Hung Li, Taoyuan (TW); Kae-Cherng Yang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 13/795,312

(22) Filed: Mar. 12, 2013

(65) Prior Publication Data
US 2014/0267060 A1  Sep. 18, 2014

(51) Int. Cl.
G06F 3/0488 (2013.01)
G06F 3/041 (2006.01)
G06F 3/0354 (2013.01)
G06F 1/16 (2006.01)

(52) U.S. Cl.
CPC ......... G06F 3/04883 (2013.01); G06F 1/1643 (2013.01); G06F 3/03545 (2013.01); G06F 3/0416 (2013.01); G06F 3/0488 (2013.01)

(58) Field of Classification Search
CPC ............. G06F 3/0482; G06F 3/04842; G06F 3/0488; G06F 3/0481; G06F 3/04817; G06F 3/0484; G06F 3/04883
USPC ........................................................ 345/173
See application file for complete search history.

(56) References Cited

U.S. PATENT DOCUMENTS

| 5,260,697 A * | 11/1993 | Barrett .................... G06F 3/038 345/173 |
| 2004/0190489 A1* | 9/2004 | Palaez .................... H04M 3/566 370/351 |
| 2006/0252442 A1* | 11/2006 | Nurmi ................. G06F 3/04817 455/518 |
| 2009/0164595 A1* | 6/2009 | Shiigi .................. G06Q 10/107 709/206 |

(Continued)

FOREIGN PATENT DOCUMENTS

| CN | 101159890 A | 4/2008 |
| DE | 20 2012 102 427 U1 | 7/2012 |

(Continued)

OTHER PUBLICATIONS

Wiki's Walkie-Talkie page (https://web.archive.org/web/20130131175452/http://en.wikipedia.org/wiki/Walkie-talkie, dated Jan. 31, 2013).*

(Continued)

Primary Examiner — Patrick F Marinelli
(74) Attorney, Agent, or Firm — Birch, Stewart, Kolasch & Birch, LLP (57) ABSTRACT

Methods for data transmission for use in an electronic device including a touch-sensitive display unit are provided. First, a first event indicating that a specific button has been pressed, and then held is received. In response to the first event, contacts and movements of an object on the touch-sensitive display unit are received and touching script data corresponding to the contacts and movements of the object are recorded. Thereafter, in response to receiving a second event indicating that the specific button has been released, the touching script data is transmitted to at least one device such that the touching script data is displayed in a display unit of the device when the touching script data has been received.

13 Claims, 10 Drawing Sheets

(56) References Cited

U.S. PATENT DOCUMENTS

| | | | | |
|---|---|---|---|---|
| 2010/0203908 A1* | 8/2010 | Jeong | G06F 3/0486 | 455/466 |
| 2011/0199343 A1* | 8/2011 | Cinqualbre | | 345/179 |
| 2012/0262407 A1* | 10/2012 | Hinckley | G06F 3/038 | 345/173 |
| 2012/0278745 A1* | 11/2012 | Kim et al. | | 715/769 |
| 2013/0106767 A1* | 5/2013 | Shahparnia et al. | | 345/174 |
| 2014/0267060 A1* | 9/2014 | Li | G06F 3/0416 | 345/173 |
| 2014/0267078 A1* | 9/2014 | Kukulski | G06F 3/0416 | 345/173 |
| 2015/0049031 A1* | 2/2015 | Maruoka | G06F 3/03545 | 345/173 |
| 2015/0100874 A1* | 4/2015 | Pallakoff | G06F 17/241 | 715/232 |

FOREIGN PATENT DOCUMENTS

| | | |
|---|---|---|
| TW | 201303655 A1 | 1/2013 |
| TW | 201308135 A1 | 2/2013 |

OTHER PUBLICATIONS

Nikon's D90 DSLR camera (https://web.archive.org/web/20121217151631/http://en.wikipedia.org/wiki/Nikon_D90, dated Dec. 17, 2012).*

* cited by examiner

ELECTRONIC DEVICES AND RELATED INPUT DEVICES FOR HANDWRITTEN DATA AND METHODS FOR DATA TRANSMISSION FOR PERFORMING DATA SHARING AMONG DEDICATED DEVICES USING HANDWRITTEN DATA

BACKGROUND OF THE INVENTION

Field of the Invention

The disclosure relates generally to methods for data transmission and related electronic devices, and, more particularly to methods for data transmission and related electronic devices and input devices for handwritten data capable of performing data sharing among dedicated devices.

Description of the Related Art

Recently, portable devices, such as handheld devices, have become more and more technically advanced and multifunctional. For example, a handheld device may have telecommunications capabilities, e-mail message capabilities, an advanced address book management system, a media playback system, and various other functions. Due to increased convenience and functions of the devices, these devices have become necessities of life.

Currently, a handheld device may be equipped with a touch-sensitive display unit. Users can directly perform operations, such as application operations and data input via the touch-sensitive display unit. Users of the handheld devices can slide their fingers to touch the items displayed by the touch screen to issue a command, and perform or control operations corresponding to the selected items. For example, users can click on a drawing button or icon displayed on the touch screen to activate a drawing function, or can click on a navigation button or icon displayed on the touch screen to activate a GPS navigation function.

As user requirements and behaviors change, data (e.g. multimedia files, messages or the like) sharing capability among different devices have become necessities of the handheld devices. Generally, when data is to be shared, users may perform a number of operations to start data transmission. For example, users may have to select data to be shared/transmitted first, select to transmit the data and then select to transmit the data to a user or device and that selects the data to be transmitted via a type of communication protocol, such as via the wireless network, via the Bluetooth or the infra-red communication protocol. After the communication protocol is determined, the determined communication protocol must be activated and the shared data can then be sent to the user to be shared via the activated communication protocol. Such a complex operation and data sharing method, however, may not meet user requirements any more.

Therefore, it is desired to provide a more attractive data transmission method for users.

BRIEF SUMMARY OF THE INVENTION

Methods for data transmission and related electronic devices and input devices for handwritten data are provided.

In an embodiment of a method for data transmission for use in an electronic device including a touch-sensitive display unit, a first event indicating that a specific button has been pressed, and then held is received. In response to the first event, contacts and movements of an object on the touch-sensitive display unit are received and touching script data corresponding to the contacts and movements of the object are recorded. Thereafter, in response to receiving a second event indicating that the specific button has been released, the touching script data is transmitted to at least one device such that the touching script data is displayed in a display unit of the device when the touching script data has been received.

An embodiment of an electronic device includes a storage unit, a touch-sensitive display unit, a processing unit and a transmission module. The touch-sensitive display unit displays visually observable data. The processing unit receives a first event indicating that a specific button has been pressed, and then held and in response to the first event, receives contacts and movements of an object on the touch-sensitive display unit and records touching script data corresponding to the contacts and movements of the object. The processing unit, in response to receiving a second event indicating that the specific button has been released, transmits the touching script data to at least one device via the transmission module such that the touching script data is displayed in a display unit of the device when the touching script data has been received.

In another embodiment of a method for data transmission for use in an electronic device at least includes a display unit, a touching script data is received from a device. Then, the touching script data is displayed in the display unit, wherein visually observable data containing the touching script data displayed in the display unit is not clickable until a specific button has been pressed or a specific gesture has been detected.

An embodiment of a stylus includes a stylus nib, a button, a control unit and a transmission module. The control unit records contacts and movements of the stylus nib in response to a first event indicating that the button has been pressed, and then held. The control unit, in response to receiving a second event indicating that the button has been released, generates touching script data corresponding to the contacts and movements of the stylus nib and transmits the touching script data to at least one device via the transmission module such that the touching script data is displayed in a display unit of the at least one device when the touching script data has been received.

Methods for data transmission may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods for data transmission and related electronic devices and styluses are provided.

Figure 1:
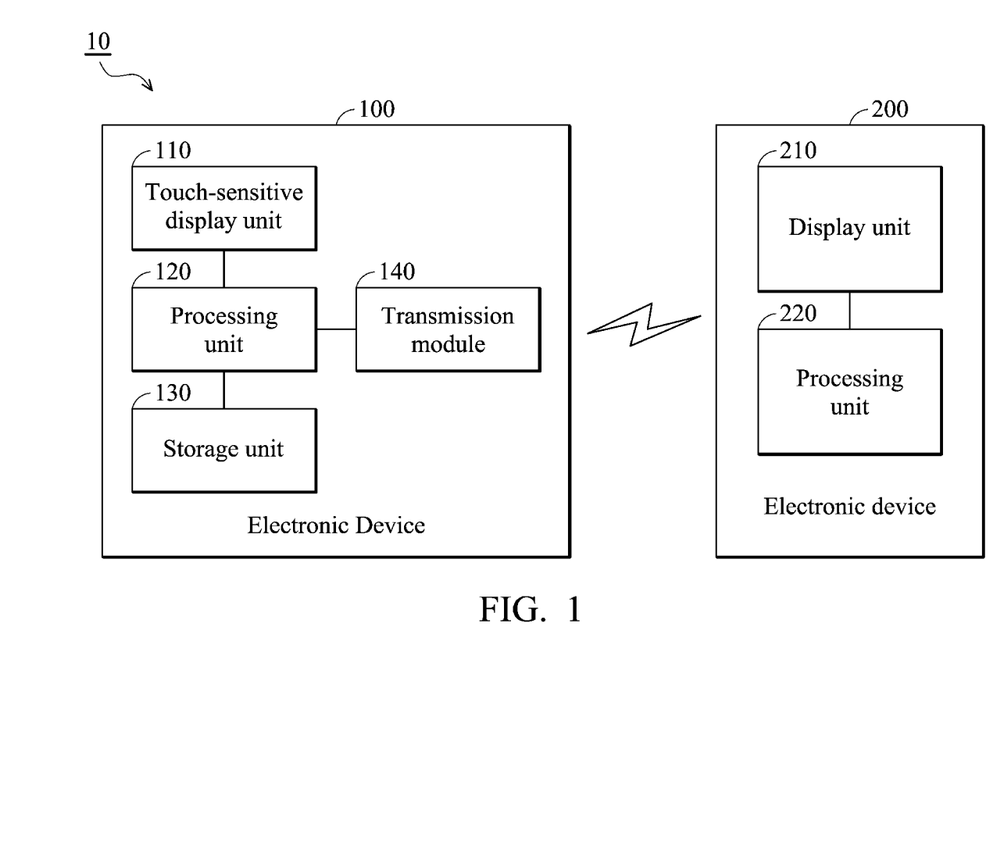
FIG. 1 is a schematic diagram illustrating an embodiment of a data transmission system of the invention.

FIG. 1 is a schematic diagram illustrating an embodiment of a data transmission system of the invention. The data transmission system 10 of the invention at least comprises an electronic device 100 and at least one electronic device 200, wherein the electronic device 100 and the at least one electronic device 200 may be communicated with each other directly through a wireless network communication or a near-field communication (NFC), such as an infra-red (IR), or Bluetooth protocol, WiFi and so on or indirectly through a server of a network. In some embodiments, the electronic device 100 and the at least one electronic device 200 are within a limited distance, and are communicated with each other through a wireless communication protocol, such as an infra-red (IR), Bluetooth protocol, WiFi and so on. The electronic device 200 may be an electronic device which is the same as the electronic device 100 or other type of electronic device, such as a smart phone, a PDA (Personal Digital Assistant), a laptop computer or a tablet computer.

The electronic device 100 may at least comprise a touch-sensitive display unit 110, a processing unit 120, a storage unit 130 and a transmission module 140. It is understood that, in some embodiments, the touch-sensitive display unit 110 may be integrated with a touch-sensitive device (not shown). The touch-sensitive device has a touch-sensitive surface comprising sensors in at least one dimension to detect contact and movement of at least one object (input tool), such as a stylus or finger near or on the touch-sensitive surface. The touch-sensitive display unit 110 can display related data, such as texts, figures, interfaces, and/or information.

The storage unit 130 can be used to store related data, such as calendars, files, web pages, images, and/or interfaces. The touch-sensitive display unit 110 can display the data provided by the storage unit 130. It is understood that, in some embodiments, the data displayed in the touch-sensitive display unit 110 may be clickable in a normal mode or may be not clickable in a first mode, e.g. a walkie-talkie mode. For example, when users press and then hold a physical button on the electronic device 100, the working mode of the electronic device 100 is changed from the normal mode to the first mode so that the screen data displayed in the touch-sensitive display unit 110 become not clickable. In some embodiments, the storage unit 130 can also store a number of gesture recognition data. The gesture recognition data within the storage unit 130 may be further be provided to the processing unit 120 for subsequent determination of the type of gesture input. The processing unit 120 which is coupled to the touch-sensitive display unit 110 can perform the data transmission method of the present invention, which will be discussed further in the following paragraphs. It is noted that, the processing unit 120 can further determine whether an object on the touch-sensitive display unit 110 is a stylus or not. In some embodiment, the processing unit 120 determines whether the object is a stylus or not by detecting whether a first event indicating that a specific button has been pressed and held is generated by the stylus or not. It is understood that, in some embodiments, a stylus may have at least one physical button. When the physical button on the stylus is pressed, a signal is transmitted from the stylus to a reception unit (not shown) of the electronic device. When the signal transmitted from the stylus is detected/received, a first event indicating that a specific button has been pressed and then held can be generated by the stylus.

The transmission module 140 may perform the functionality of wireless transmissions and receptions to and from a wireless network using a wireless network communication or a near-field communication (NFC), such as an infra-red (IR), or Bluetooth protocol, WiFi and so on. For example, the electronic device 100 may communicate with the at least one electronic device 200 through the transmission module 140 via a NFC.

The electronic device 200 at least comprises a display unit 210 and a processing unit 220, wherein the display unit 210 at least displays visually observable data such as a user interface and related data and icons. Similarly, in one embodiment, the display unit 210 is the same as the touch-sensitive display unit 110.

Figure 2:
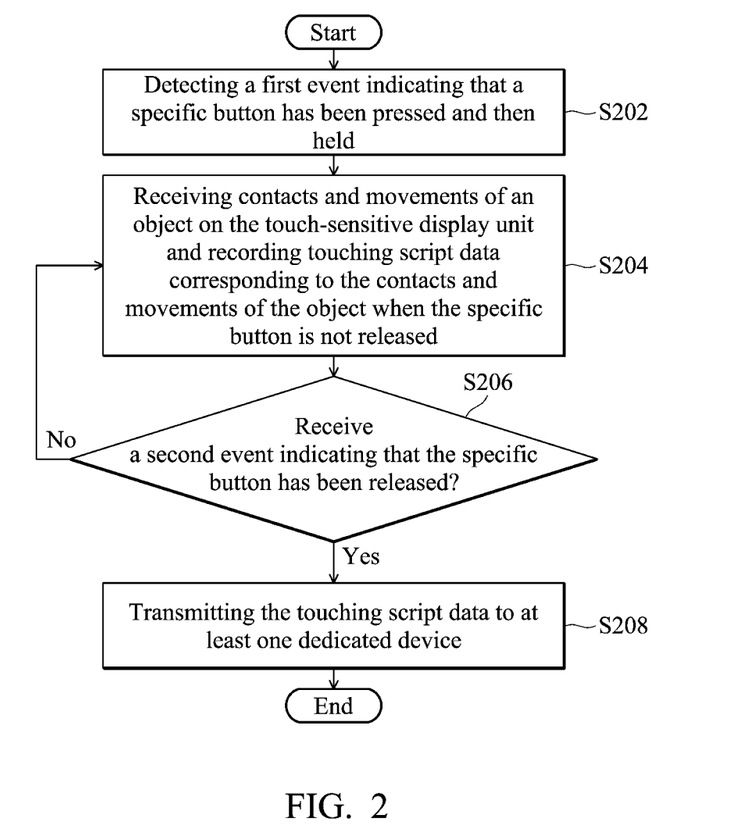
FIG. 2 is a flowchart of an embodiment of a data transmission method of the invention.

FIG. 2 is a flowchart of an embodiment of a data transmission method of the invention. Please refer to FIGS. 1 and 2. The data transmission method can be applied to an electronic device, such as a portable device, e.g. a PDA, a PDA phone, a smart phone, a mobile phone, an MID, a laptop computer, a tablet computer, a car computer, a digital camera, a multi-media player, a game device, or any other type of handheld device. However, it is to be understood that the invention is not limited thereto. It is to be noted that, in this embodiment, the electronic device comprises a touch-sensitive display unit and the touch-sensitive display unit displays visually observable data which is clickable by users. Users may use an object, such as a pen/stylus or finger to perform operations to the visually observable data.

First, in step S202, the processing unit 120 receives a first event indicating that a specific button has been pressed and held. It is understood that, the first event indicating that a specific button has been pressed and held can be generated by the stylus or the electronic device. In some embodiments, the specific button may be configured on the electronic device and the first event is generated by the electronic device when the specific button on the electronic device has been pressed and held. The specific button on the electronic device can be a physical button or a software button. In some embodiments, when the object is a stylus, the specific button may be configured on the stylus and the first event is generated by the stylus when the specific button on the stylus has been pressed and held.

In response to the first event, in step S204, the processing unit 120 receives contacts and movements of an object on the touch-sensitive display unit 110 and records touching script data corresponding to the contacts and movements of the object. In this step, users may use the object, such as a pen/stylus or a finger, to draw words or pictures and anything drawing by the object on the touch-sensitive display unit 110 can be recorded as touching script data. It is noted that, the contacts and movements of the object on the touch-sensitive display unit 110 can form touching script data, and the touching script data corresponding to the object can also be displayed in the touch-sensitive display unit 110 in step S204. Further, in this step, the working mode of the electronic device is changed from the normal mode to the first mode such that the visually observable data containing the touching script data displayed in the touch-sensitive display unit 110 become not clickable.

In step S206, the processing unit 120 then determines whether a second event indicating that the specific button has been released has been received. In some embodiments, the specific button may be configured on the electronic device and the second event is generated by the electronic device when the specific button on the electronic device has been released. In some embodiments, when the object is a stylus including the specific button, the second event is generated by the stylus when the specific button on the stylus has been released.

If the second event has not been received (No in step S206), which means that the specific button still be pressed and held, the procedure returns to step S204. Note that the visually observable data displayed in the touch-sensitive display unit 110 is not clickable when the specific button has not been released. In response to receiving the second event indicating that the specific button has been released (Yes in step S206), in step S208, the processing unit 120 transmits the touching script data to at least one device. In this step, the working mode of the electronic device is changed from the first mode back to the normal mode so that the visually observable data displayed in the touch-sensitive display unit become clickable when the specific button has been released. In some embodiments, the processing unit 120 may transmit the touching script data to at least one device via the transmission module 140 via a wireless network or a near field communication (NFC), such as an infra-red (IR), or Bluetooth communication link and so on. In some embodiments, the processing unit 120 may transmit the touching script data to a server of a network, such as a server of a social network (e.g. the Facebook™ social network), via the transmission module 140 and further to at least one device via the server of the network. It is understood that, in some embodiments, the at least one device to be transmitted can be configured in advance. In some embodiments, the at least one device may be a single device so that the electronic device performs a peer-to-peer (P2P) communication with the device being communicated with via the transmission module 140. In some embodiments, the electronic device 100 may configure a known sharing group in advance, and then selectively share the touching script data to a portion of or all of members within the sharing group and the at least one device may be a group of authorized devices or one or more devices selected from this group so that the electronic device 100 may transmit touching script data to all of the group of the authorized devices or the dedicated devices only.

Upon reception of the touching script data from the electronic device 100, the processing unit 220 of the electronic device 200 displays the touching script data in the display unit 210 of the electronic device 200 and the visually observable data displayed in the display unit 210 is not clickable. The visually observable data displayed in the display unit 210 is clickable until a specific button has been pressed or a specific gesture has been detected by the processing unit 220.

Similarly, in some embodiments, the electronic device 100 may then receive a replied touching script data from the electronic device 200 via the transmission module 140 and the processing unit 120 displays the replied touching script data in the touch-sensitive display unit 110, wherein the visually observable data containing the replied touching script data displayed in the touch-sensitive display unit 110 is not clickable until the specific button has been pressed or a specific gesture has been detected.

Figure 3:
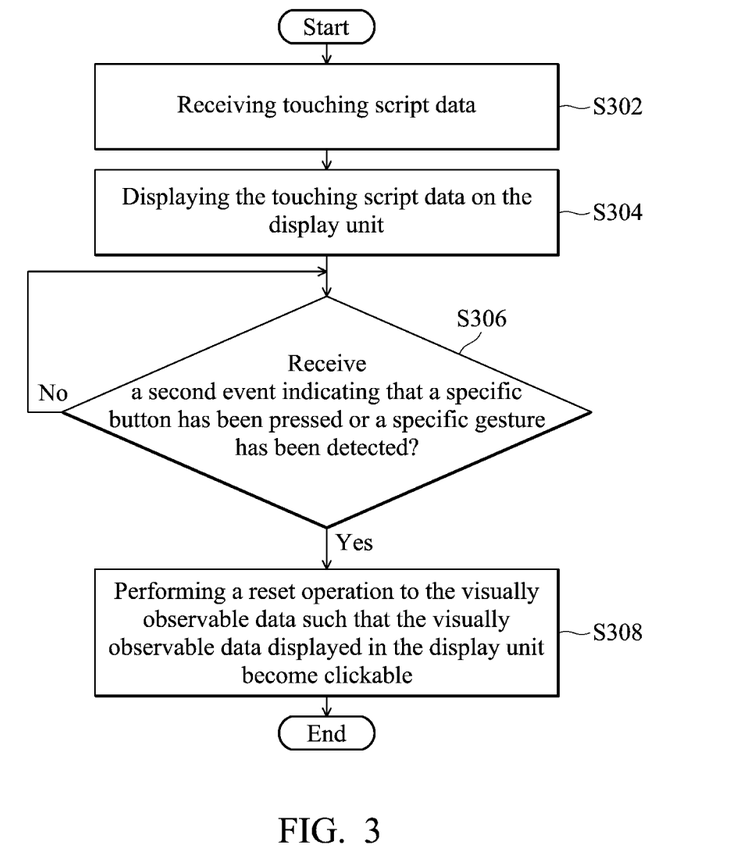
FIG. 3 is a flowchart of another embodiment of a data transmission method of the invention.

FIG. 3 is a flowchart of an embodiment of a data transmission method of the invention. The data transmission method can be applied to an electronic device, such as a TV, a desktop computer or the like, or a portable device, e.g. a PDA, a smart phone, a mobile phone, an MID, a laptop computer, a tablet computer, a car computer, a digital camera, a multi-media player, a game device, or any other type of handheld device; however, it is to be understood that the invention is not limited thereto. It is to be noted that, in this embodiment, the electronic device is the electronic device 200 shown in FIG. 1 and comprises a display unit 210, wherein the display unit 210 displays visually observable data which is clickable by users of the electronic device.

In step S302, the electronic device 200 receives a touching script data from a device (e.g. the electronic device 100). After receiving the touching script data, in step S304, the electronic device 200 displays the touching script data in the display unit 210. In this step, the touching script data is displayed in the display unit 210 and the visually observable data containing the touching script data displayed in the display unit 210 is not clickable. Users of the electronic device 200 may then read/check the touching script data and press a specific button of the electronic device 200 or perform a specific gesture on the display unit 210 after reading/checking the touching script. In step S306, the electronic device 200 then determines whether a specific button has been pressed or a specific gesture has been detected. When determining that the specific button has not been pressed and the specific gesture has not been detected (No in step S306), the procedure returns to step S304. When determining that the specific button has been pressed or the specific gesture has been detected (Yes in step S306), in step S308, the electronic device 200 performs a reset operation to the visually observable data such that the visually observable data displayed in the display unit 210 become clickable.

For example, please refer to FIGS. 4A-4F. FIGS. 4A to 4F are schematic diagrams illustrating an embodiment of an example of a user interface variation and responsive operation result of the data transmission method of the invention, wherein FIGS. 4A, 4C and 4F correspond to the electronic device 100 and FIGS. 4B, 4D and 4E correspond to the electronic device 200.

Figure 4A:
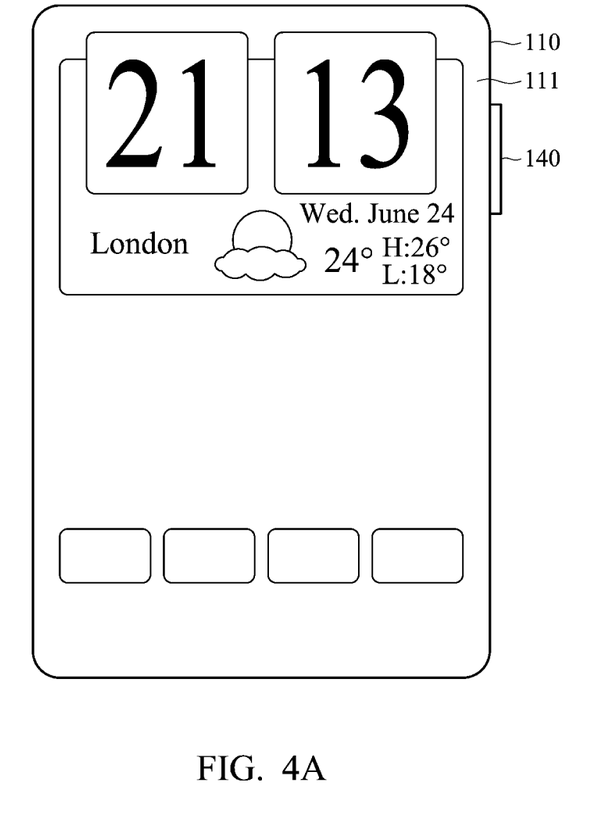
FIGS. 4A to 4F are schematic diagrams illustrating an embodiment of an example of a user interface variation and responsive operation result of the data transmission method of the invention.
Figure 4B:
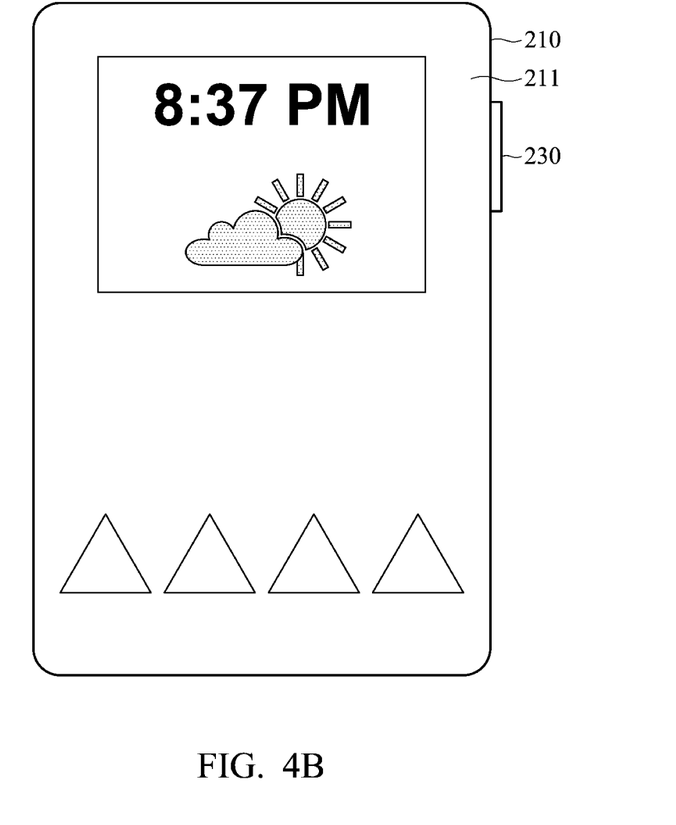
Figure 4C:
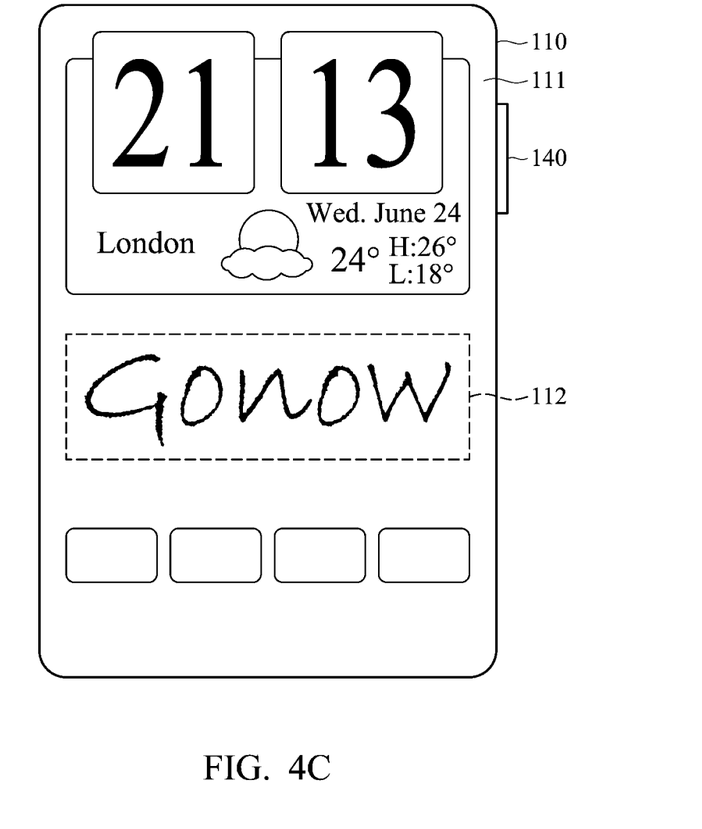

For explanation, the electronic device 100 communicates with the electronic device 200 via a peer-to-peer (P2P) communication link are illustrated as examples in this embodiment, and those skilled in the art will understand that the present invention is not limited thereto. As shown in FIG. 4A, the touch-sensitive display unit 110 can display visually observable data 111, wherein the visually observable data 111 is clickable. As shown in FIG. 4B, the touch-sensitive display unit 210 can display visually observable data 211, wherein the visually observable data 211 is also clickable. When a user of the electronic device 100 attempt to pass a message to another user of the electronic device 200, the user of the electronic device 100 can press, and then hold the physical button 140 to drawing messages to be transmitted on the touch-sensitive display unit 110. The visually observable data 111 becomes not clickable and the processing unit 120 receives a first event indicating that the specific button has been pressed and then held and in response to the first event, performs step S204 to receive contacts and movements of an object on the touch-sensitive display unit 110 and records touching script data 112 corresponding to the contacts and movements of the object. The processing unit 120 displays the touching script data corresponding to the object in the touch-sensitive display unit 110, as shown in FIG. 4C. After the user of the electronic device 100 completes the drawing of the message, the user may release the physical button 140. The processing unit 120 then receives a second event indicating that the specific button has been released and thus performs step S208 to transmit the touching script data 112 to the electronic device 200 via the transmission module 140 via a wireless network or a near field communication. The visually observable data 111 displayed in the touch-sensitive display unit is clickable when the button 140 has been released.

Figure 4D:
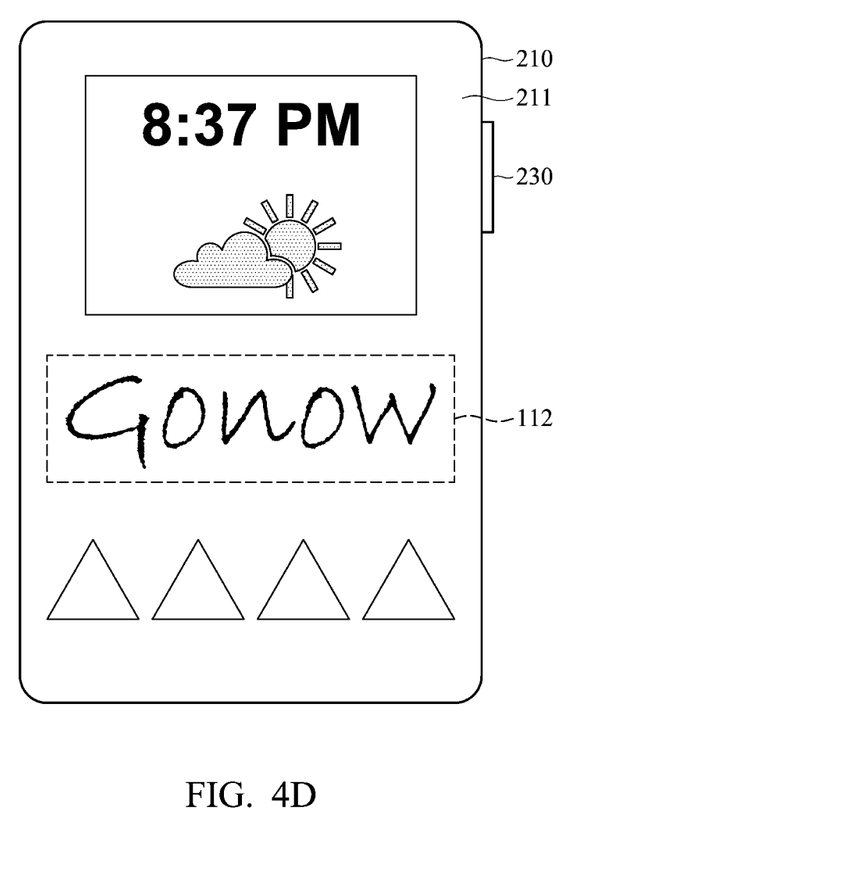

Upon reception of the touching script data 112 from the electronic device 100, the processing unit 220 of the electronic device 200 displays the touching script data 112 in the touch-sensitive display unit 210 of the electronic device 200 and the visually observable data 211 displayed in the display unit 210 is not clickable, as shown in FIG. 4D.

Figure 4E:
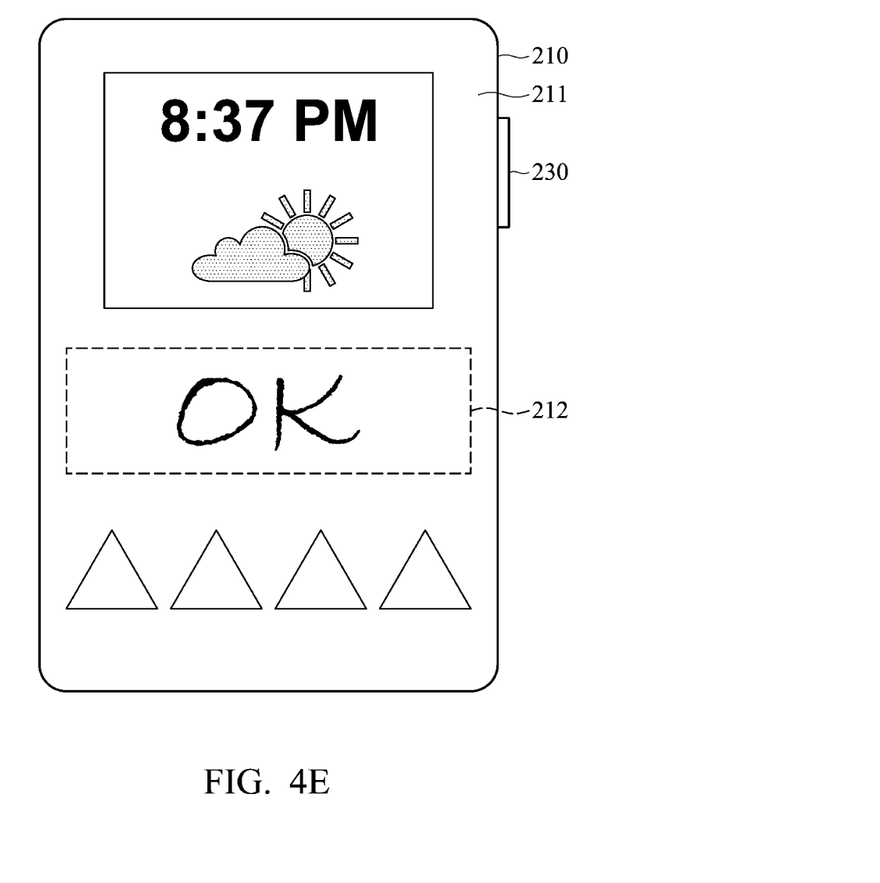
Figure 4F:
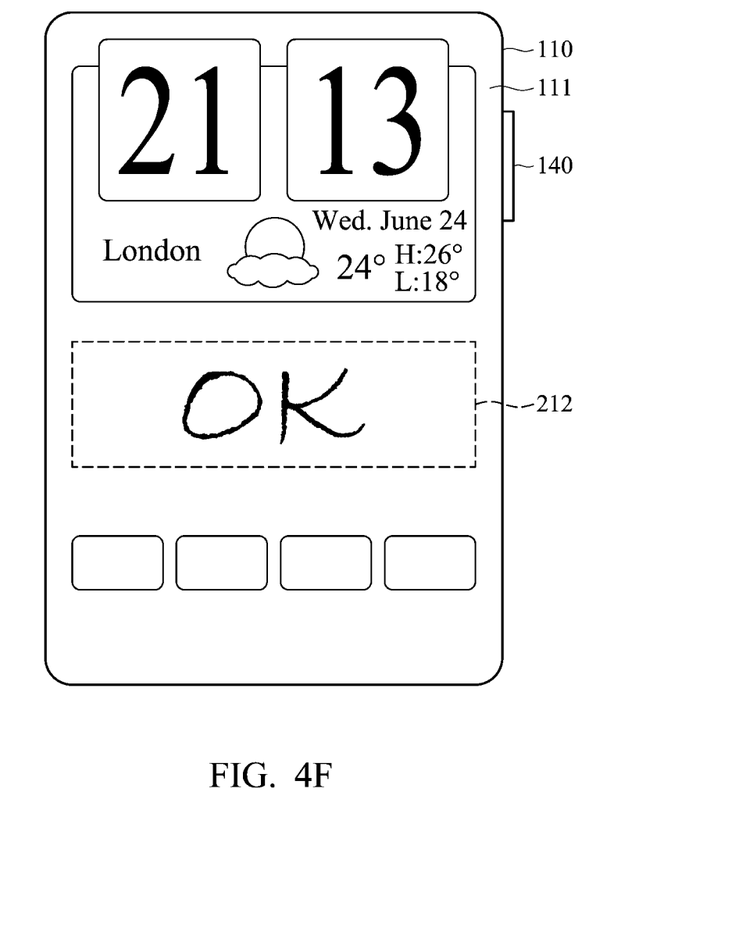

When the user of the electronic device 200 reads message indicating by the touching script data and attempts to reply a message to the user of the electronic device 100, the user of the electronic device 200 can press, and then hold the physical button 230 to drawing messages to be transmitted on the touch-sensitive display unit 210. Similarly, the processing unit 120 receives an event indicating that the button 230 has been pressed and held and in response to the event, receives contacts and movements of an object on the touch-sensitive display unit 110 and records touching script data 212 corresponding to the contacts and movements of the object. The processing unit 220 may then display the touching script data 212 corresponding to the object in the touch-sensitive display unit 210, as shown in FIG. 4E. After the user of the electronic device 200 completes the drawing of the message, the user may release the physical button 230. The processing unit 220 then receives a second event indicating that the button 230 has been released and transmits the touching script data 212 back to the electronic device 100 via the wireless network or the near field communication. Thus, the touching script data 212 sent by the electronic device 200 can then be displayed on the touch-sensitive display unit 110, as shown in FIG. 4F. The electronic device 100 of the present application can automatically transmit the touching script data written/drawn by the user to dedicated devices. The dedicated devices can be all or a potion of a group of devices.

Figure 5:
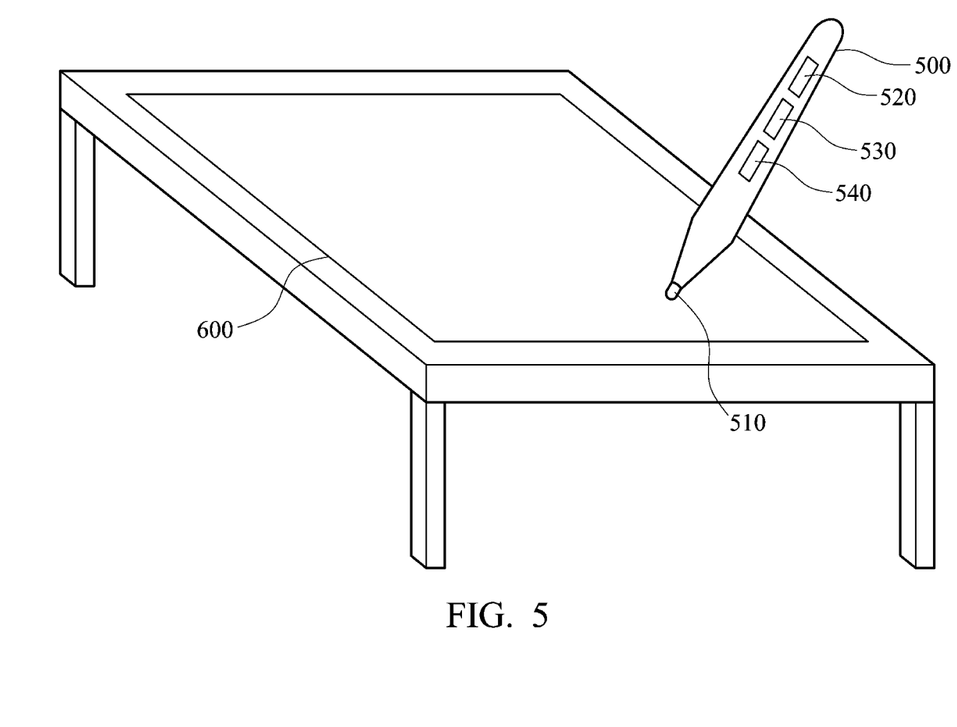
FIG. 5 is a schematic diagram illustrating an embodiment of an example of a stylus of the invention.

In some embodiments, an input device for handwritten data such as the stylus may further comprise the capability of receiving and recording contacts and movements of the stylus nib and a data transmission method of the invention can be applied to the stylus. FIG. 5 is a schematic diagram illustrating an embodiment of an example of a stylus of the invention. In this embodiment, the input device for handwritten data can be pen, stylus or any input device capable of inputting handwritten data, but the invention is not limited thereto. As shown in FIG. 5, the stylus 500 may comprise a stylus nib 510, a button 520, a control unit 530 and a transmission module 540. The stylus 500 can perform a drawing operation on a plane 600. The control unit 530 may start recording contacts and movements of the stylus nib 510 on the plane 600 in response to a first event indicating that the button 520 has been pressed, and then held and in response to receiving a second event indicating that the button has been released, stop the recording of contacts and movements of the stylus nib and generate touching script data corresponding to the contacts and movements of the stylus nib and transmit the touching script data to at least one dedicated device via the transmission module 540 such that the touching script data is displayed in a display unit of the at least one dedicated device when the touching script data has been received. In some embodiments, the stylus 500 may further comprise buttons (not shown) for selecting and indicating the at least one device. In some embodiments, the stylus 500 may further comprise a display unit (not shown) for displaying the touching script data.

Therefore, the methods for data transmission and related electronic devices and input devices for handwritten data (e.g. styluses) can provide a way to post/receive information which is in form of free drawing by a single button to start and complete a drawing and then automatically transmit the touching script data corresponding to the drawing to dedicated devices such that the touching script data can be displayed in the display unit of the dedicated devices, thus increasing operational convenience, and making data transmission between devices quicker and easier.

Methods for data transmission, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for data transmission, for use in an electronic device at least comprising a touch-sensitive display unit, comprising:
    receiving a first event indicating that a specific button has been pressed and then held;
    in response to the first event, receiving contacts and movements of an object on the touch-sensitive display unit and recording touching script data corresponding to the contacts and movements of the object; and
    in response to receiving a second event indicating that the specific button has been released, transmitting the touching script data to at least one device such that the touching script data is displayed in a display unit of the device when the touching script data has been received,
    wherein visually observable data containing the touching script data displayed in the touch-sensitive display unit is not clickable by the object when the specific button has not been released and is clickable by the object when the specific button has been released, and
    wherein the object is a stylus including the specific button and the first event indicating that the specific button has been pressed and held is generated by the stylus.

2. The method of claim 1, wherein the step of recording touching script data corresponding to the contacts and movements of the object further comprises:
    displaying the touching script data corresponding to the contacts and movements of the object in the touch-sensitive display unit.

3. The method of claim 1, wherein the step of transmitting the touching script data to at least one device further comprises:
    transmitting the touching script data to the at least one device via a wireless network or a near field communication (NFC).

4. The method of claim 1, wherein the step of transmitting the touching script data to at least one device further comprises:

transmitting the touching script data to the at least one device via a server of a network.

5. The method of claim 1, further comprising:
receiving a replied touching script data from the device; and
displaying the replied touching script data in the touch-sensitive display unit, wherein the visually observable data displayed in the touch-sensitive display unit is not clickable until the specific button has been clicked or a specific gesture has been detected.

6. An electronic device, comprising:
a storage unit;
a touch-sensitive display unit displaying visually observable data;
a transmission module; and
a processing unit receiving a first event indicating that a specific button has been pressed, and then held,
in response to the first event, receiving contacts and movements of an object on the touch-sensitive display unit and recording touching script data corresponding to the contacts and movements of the object, and
in response to receiving a second event indicating that the specific button has been released, transmitting the touching script data to at least one device via the transmission module such that the touching script data is displayed in a display unit of the device when the touching script data has been received,
wherein visually observable data containing the touching script data displayed in the touch-sensitive display unit is not clickable by the object when the specific button has not been released and is clickable by the object when the specific button has been released, and
wherein the object is a stylus including the specific button and the processing unit further receives the first event generated by the stylus.

7. The electronic device of claim 6, wherein the processing unit further displays the touching script data corresponding to the contacts and movements of the object in the touch-sensitive display unit when recording touching script data corresponding to the contacts and movements of the object.

8. The electronic device of claim 6, wherein the processing unit further transmits the touching script data to the device via the transmission module via a wireless network or a near field communication (NFC).

9. The electronic device of claim 6, wherein the processing unit further transmits the touching script data to the device via the transmission module via a server of a network.

10. An input device for handwritten data, comprising:
a stylus comprising a stylus nib and a button;
a button;
a transmission module; and
a control unit recording contacts and movements of the stylus nib in response to a first event indicating that the button has been pressed and then held, and
in response to receiving a second event indicating that the button has been released, generating touching script data corresponding to the contacts and movements of the stylus nib and transmitting the touching script data to at least one device via the transmission module such that the touching script data is displayed in a display unit of the at least one device when the touching script data has been received,
wherein visually observable data containing the touching script data displayed in the touch-sensitive display unit is not clickable by the stylus nib when the specific button has not been released and is clickable by the stylus nib when the specific button has been released.

11. The input device for handwritten data of claim 10, further comprising buttons for selecting and indicating the at least one device.

12. The input device for handwritten data of claim 10, further comprising a display unit for displaying the touching script data.

13. A non-transitory machine-readable storage medium comprising a computer program, which, when executed, causes a device to perform a method for data transmission, wherein the method comprises:
receiving a first event indicating that a specific button has been pressed and held;
in response to the first event, receiving contacts and movements of an object on a touch-sensitive display unit and recording touching script data corresponding to the contacts and movements of the object; and
in response to receiving a second event indicating that the specific button has been released, transmitting the touching script data to at least one device,
wherein visually observable data containing the touching script data displayed in the touch-sensitive display unit is not clickable by the object when the specific button has not been released and is clickable by the object when the specific button has been released, and
wherein the object is a stylus including the specific button and the processing unit further receives the first event generated by the stylus.

* * * * *